RE 25,451

United States Patent Office 2,943,070
Patented June 28, 1960

2,943,070

PREVENTION OF DEVELOPMENT OF COLOR BY IRON COMPOUNDS IN PLASTICS

Arthur C. Hecker, Richmond Hill, and Mark W. Pollock, New York, N.Y., assignors to Argus Chemical Corporation, a corporation of New York No Drawing. Filed Oct. 11, 1957, Ser. No. 689,503

10 Claims. (Cl. 260—23)

This invention relates to bleaching colored iron compounds in plastics and, in another embodiment, to preventing development of the color of such compounds initially. The invention is particularly applicable in the manufacture of pigmented floor tile containing thermoplastic material and will be first illustrated by description in connection with such use.

It is customary in making the floor tile to use polyvinyl plastic with a fibrous reinforcing agent and a large proportion of pigment of which calcium carbonate in finely divided form is representative. When the reinforcing agent is a material such as a purified asbestos, the resulting floor tile retains its original established color, which is white to gray when the pigment is calcium carbonate, without substantial discoloration during hot compounding or a couple of hours or more of subsequent heat testing at 300° F. When, however, there is incorporated an iron compound or when the asbestos is used in the unpurified state containing a normal content of iron compounds, then there is developed, during heating as at 300° F., a purple to bluish gray color that is very pronounced even after 15 minutes heating.

We have now discovered that, when the composition including the iron containing asbestos is compounded in usual manner as by rolling at a stock temperature of about 275° F. for 20 minutes and the purple to bluish gray discoloration is so developed, introducing our special protecting agent, here actually a bleaching agent, and then subjecting the recompounded material to the heating test at 300° F. for 2 hours causes bleaching of the original purple. The bleaching is pronounced in 5 minutes and the color becomes lighter as the heating continues. This is in contrast to the increase in color ordinarily obtained with various plastic compositions, subject to heat discoloration, as the period of heating is lengthened.

Likewise we have found that incorporation of our protective agent at the beginning of the compounding or milling operation prevents the development of the discoloration referred to, without the need of any additional heating period to bleach the color that would otherwise have appeared.

Briefly stated, our invention comprises floor tile or like article including a plastic, a source of hydrogen halide, an iron compound, and an agent protecting the iron from development of color on heating in contact with the other components of the composition.

The invention comprises also the use of the protecting agent as a color discharging material for lightening the color of a plastic composition of kind described that may have been discolored at an elevated temperature.

The plastic used is one containing a polyvinyl chloride, the term polyvinyl chloride being used herein to include resins consisting essentially of polyvinyl chloride (PVC) or copolymers thereof with vinyl acetate, vinylidene chloride and the like, the proportion of the PVC in the copolymers being 50–98 parts for 100 total weight of the copolymer and ordinarily about 80–95 parts. An example of such copolymer that we use is the commercial VYHH, a copolymer of 87 parts of vinyl chloride and 13 of vinyl acetate.

Iron-containing asbestos is the source of the iron compound, the asbestos used being any iron-containing variety although we actually use chrysotile asbestos. This asbestos contains both ferrous and ferric compounds, as for instance, about 0.1–5 parts of each calculated as ferrous oxide and ferric oxide, respectively, for 100 of the asbestos and generally total iron calculated as ferric oxide within the range 2–8 parts.

The protecting agent used for its effect on color of the composition is one that is compatible with the selected plastic material at compounding temperatures and in the proportion used is substantially non-separating therefrom in either the hot condition of compounding or on cooling to atmospheric temperature. The agent is heat stable, that is not heat decomposable to a large extent, at the temperature of compounding. For permanent effect, it should have substantially no or only a low vapor pressure and, therefore, a slow rate of volatility at ordinary temperatures. Examples of materials that meet these requirements and that may be used are the organic polyols, poly as applied to the hydroxyl content meaning two or more alcoholic OH groups. Examples are the aliphatic polyhydroxy compounds such as trimethylolethane, pentaerythritol, sorbitol, mannitol, methyl glucoside, sucrose, hydroxy propylsucrose (hyprose) and their partial esters with any carboxylic acid, and polyhydroxy substituted acids such as gluconic, arabonic, and glucoheptoic acids and their lactones, salts, and esters, examples being $C_4$–$C_{18}$ alkyl esters and the sodium, potassium, and ammonium salts. Also we may use cyclo-aliphatic polyhydroxy compounds, examples of which are hydrogenated bisphenol A and base catalyzed condensation products of acetone or cyclohexanone with formaldehyde.

For improved maintenance of the physical properties of the composition we may and suitably do introduce also an epoxy compound such as epoxidized fatty glycerides, as for instance epoxidized soybean oil and other epoxidized higher fatty acid esters including the butyl, hexyl, octyl and glycol esters of oleic, linoleic, and like unsaturated acids; glycidyl ethers of phenols such as phenol itself, resorcinol and bisphenol A; and glycidyl ethers of the alcohols of which examples are the $C_6$–$C_{18}$ monohydric alcohols such as lauryl, cyclohexyl and octadecyl and the polyhydric alcohols such as the $C_2$–$C_8$ alkene diols, particularly ethylene, propylene, and butylene glycols, and glycerine.

The introduction of white pigments into the plastic, as in a pigmented vinyl resin floor tile, makes the effect of the protective agent more conspicuous than otherwise is the case. The pigment that we ordinarily use in the floor tile is finely divided calcium carbonate (Atomite). Other pigments that may be used are titanium dioxide, silica, and others that are conventional for this purpose and are selected to provide the color desired.

The applicants' protecting agent is still required when the pigment used is one that is an antacid and would be expected, therefore, to neutralize any hydrogen chloride developed in the plastic composition during the compounding at elevated temperatures. Thus the protective agent is necessary when the plastic composition used is one containing, as the resin, polyethylene with a small proportion of ammonium chloride distributed therethroughout or when the resin selected is polyvinyl chloride, even though the pigment used may be a large proportion of the finely divided calcium carbonate.

The usual plasticizers are introduced, dioctyl phthalate or any of the epoxy compounds referred to above being ones commonly used. Additional plasticizers that may be used are dibutyl or dioctyl sebacate and tricresyl phosphate. The plasticizer must be a liquid compatible with the resin at compounding temperatures and non-separating therefrom in objectionable proportion at low winter temperatures. Also the plasticizer should be non-volatile or volatilizable only at a very slow rate at ordinary temperatures.

As to proportions, these, for the conventional materials, are those that are usual in products of the class to be made. Thus a commercial floor tile may contain the several components in about the proportions shown, satisfactory ranges of proportions being given in the parentheses: vinyl resin 100 parts, plasticizer 20 (15–60), asbestos 100 (25–200), calcium carbonate or other pigment 160 (10–200), protective agent 3 (1–10), and epoxy compound 2 (0–10). The proportions within these ranges will vary somewhat with the activity of the several components per unit of weight. The pigment, for example, will be low in proportion when it is one of exceptional hiding power. In the case of titanium dioxide, for instance, a suitable proportion is 12 parts for 100 of the resin. With the calcium carbonate pigment, on the other hand, the proportion may be as high as 200 parts. Likewise the proportion of plasticizer is lower within the range stated when the plasticizer is one that is an active solvent for the vinyl resin and higher within the said range when it is a less effective solvent for the vinyl resin.

As to conditions of manufacture, the protective agent may be used in one of two manners.

When used to discharge a color previously developed by action of the iron with a component of the hot compounded plastic composition, the protective agent is introduced near the end of the compounding operation. The compounding at the elevated temperatures such as 250°–300° F. is then continued until the purple or blue color originally developed has been bleached to about the white, gray, or other original color. When the protective agent is intended to avoid development of color initially, the agent is introduced into the composition before or at about the beginning of the compounding operation, that is, before there is any substantial period of hot-rolling or other mixing at the elevated temperature of compounding.

Ordinarily we effect the compounding of the polyethylene or PVC plastic with the asbestos, protective agent, and other components on the usual type of rubber mixing rolls, the temperature used being sufficient to cause compatibility of the various organic materials and sufficient flowability on the hot rolls to give uniform mixing.

The mixing by rolling or otherwise is continued until the composition becomes practically uniform, that is, the fibers of asbestos and the other components are mixed sufficiently uniformly to meet commercial standards. This requires ordinarily about 5 to 30 minutes.

The invention will be further illustrated by detailed description in connection with the following specific examples of the practice of it. In these examples and elsewhere herein proportions are expressed as parts by weight.

*Example 1*

In this example, the protective agent is pentaerythritol. Its effect was tested first on a polyvinyl chloride floor tile composition with white pigment, no iron being present in the asbestos or in other component of the composition. The effect of the agent on discoloration, in compounding and in 2 hours' subsequent heating of the sheeted stock at 300° F., was completely negative.

When, however, the commercial grade of asbestos containing iron was incorporated, in place of the purified, iron-free asbestos, the effect of the pentaerythritol was exceedingly great. The specimens of the product retained practically the original color during all of the 2 hours' heating, whereas specimens without the pentaerythritol turned to a purple after a 15-minutes heating at 300° F. and to an intense blue-gray or blue-purple color in 30 minutes.

The more detailed information follows.

The basic plastic composition used for modification was of the following proportions:

| Component | Parts |
|---|---|
| VYHH (87% PVC—13% PVAc) | 100 |
| DOP (dioctyl phthalate plasticizer) | 18 |
| Epoxidized soybean oil plasticizer | 2.5 |
| TiO$_2$ pigment | 12 |

This basic stock formula with the modifying components (additives), shown in the following table were compounded at 275° F. for about 20 minutes on the two-roll rubber mill. Samples of the product were sheeted off and observed for color at the conclusion of this rolling period and at 15-minute intervals thereafter during heating tests at 300° F. for a total of 2 hours. The additive introduced into the basic stock or composition, for each of the preparations, and the results of the heating tests are shown in the following table:

| Product | Additive and Amount for 100 Parts VYHH | Color of Product | |
|---|---|---|---|
| | | On Conclusion of Milling | After 2 hours at 300° F. |
| A | Atomite (CaCO$_3$) 100 | White | White. |
| B | PE (pentaerthyritol) 4+A | do | Faint yellow. |
| C | Purified asbestos 100 | Grayish white | Grayish white. |
| D | C+PE 4 | do | Do. |
| E | Asbestos (6% iron *) 100 | Light bluish gray | Deep purple. |
| F | E+PE 4 | Light gray | Light gray. |
| G | C+Ferrous gluconate 2 | Grayish white | Bluish gray. |

\* Total iron=2.7% ferrous and 3.3% ferric, both calculated as oxides.

The sample G shows the effect of iron added in form other than in the asbestos in also developing color in the 2-hour heating test.

Once the effects described have been obtained, various theories may be advanced to explain the results. We consider that the withdrawal or otherwise prevention of iron from its usual reaction with other components of the plastic mixture, by the protective agent, is an important cause of the effects obtained. That the color developing reaction involves oxidation is indicated by the much more intense color developed on the faces of the samples E (Example 1), that were exposed to direct contact with air during the 2-hour heating, than on the back of the sample.

*Example 2*

The basic stock in this example was a standard high pressure process polyethylene (DYNH) 100 parts, iron containing chrysotile asbestos (grade 7R) 50 parts, and titanium dioxide pigment 10. The stock after compounding alone was tested for 2 hours at 300° F. with observance of the color every 15 minutes. The basic stock was also modified during the compounding operation by the addition of other components as recorded in the table below and with the results shown.

| Product | Modifier and Amount for 100 Parts DYNH | Color of Product | |
|---|---|---|---|
| | | On Conclusion of Milling | After 2 hours at 300° F. |
| H | None | Grayish white | Same. |
| I | Ammonion chloride 2 | do | Faint Bluish cast. |
| J | Ammonium chloride 10 | do | Bluish cast. |
| K | Ammonium chloride 10 +PE 4 | do | Very faint yellow cast. |

These results show the effect of 10% of ammonium chloride, a potential source of hydrogen chloride in causing the iron to be reactive in development of color, particularly in sample J. The effect of the small amount of protective agent, 4 parts of pentaerythritol, in preventing the development of purplish color is shown in sample K.

*Example 3*

The general procedure and composition of Example 1 was followed, particularly for product E with asbestos containing iron, except that the pigments used were 12 parts of titanium dioxide and 160 of the Atomite (CaCO₃) for 100 of the VYHH and various other polyols were substituted for the pentaerythritol.

With all the polyols tried, the samples direct from the roller mixing at 275° F. for 20 minutes were grayish white.

The various polyols used and the color results after 2 hours at 300° F. are shown in the following table.

| Polyol Used and Parts for 100 of the Resin | Color of Sheeted Stock After 2 Hours at 300° F. |
| --- | --- |
| n-Butyl gluconate 6 | Increased gray. |
| Hydroxy propylsucrose 6 | Substantially unchanged. |
| Hydrogenated Bisphenol A 12 | Increased gray. |

The sucrose derivative used is Hyprose SP-80.

*Example 4*

The procedure of Example 3 was followed with additional polyols tested with the VYHH resin. It was found after 2 hours at 300° F. that methyl glucoside and sorbitol were more effective on an equal weight basis than pentaerythritol in protecting the iron compound from the undesired color development on heating in the VYHH at 300° F. for 2 hours.

*Example 5*

The procedure of Example 1 with the composition of product E (asbestos containing iron) is followed with the substitution of the pentaerythritol separately and on an equal weight basis by each of the protective agents disclosed and not used in later examples and the substitution of the plasticizer separately by any other plasticizer disclosed herein, also on an equal weight basis.

It is to be understood that it is intended to cover all changes and modifications of the examples of the invention herein chosen for the purpose of illustration which do not constitute departures from the spirit and scope of the invention.

This application is a continuation-in-part of Serial No. 403,072, now Patent No. 2,837,490.

We claim:

1. A polyvinyl chloride resin composition resistant when heated at elevated temperatures to the development of discoloration due to iron compounds present in asbestos as naturally-occurring, consisting essentially of a polyvinyl chloride resin, naturally-occurring asbestos containing iron compounds in an amount to discolor the polyvinyl chloride when heated, and an amount to inhibit such discoloration of a saturated organic polyhydroxy compound having at least two to about eight alcoholic hydroxyl groups for each two to about fifteen carbon atoms.

2. A polyvinyl chloride resin composition in accordance with claim 1 in which the polyhydroxy compound is a polyhdric aliphatic alcohol.

3. A polyvinyl chloride resin composition in accordance with claim 2 in which the polyhydric alcohol is pentaerythritol.

4. A polyvinyl chloride resin composition in accordance with claim 2 in which the polyhydric alcohol is sorbitol.

5. A polyvinyl chloride resin composition in accordance with claim 1 comprising an epoxidized fatty glyceride.

6. A polyvinyl chloride resin floor tile composition comprising a polyvinyl chloride resin composition in accordance with claim 1 and a pigment.

7. A polyvinyl chloride resin floor tile composition comprising a polyvinyl chloride resin and, per 100 parts of the polyvinyl chloride, from 10 to 200 parts of an inorganic pigment, from 25 to 200 parts of naturally-occurring asbestos containing iron compounds in an amount to discolor the polyvinyl chloride when heated and an amount to inhibit such discoloration of a saturated organic polyhydroxy compound having at least two to about eight alcoholic hydroxyl groups for each two to about fifteen carbon atoms.

8. A polyvinyl chloride resin floor tile composition in accordance with claim 7 which in addition contains up to 10 parts of an epoxidized fatty glyceride.

9. A process of preparing an asbestos-containing polyvinyl chloride resin composition protected when heated against discoloration due to iron compounds present in the asbestos as naturally-occurring which comprises including in the polyvinyl chloride resin composition an amount sufficient to inhibit such discoloration of a saturated organic polyhydroxy compound having at least two to about eight alcoholic hydroxyl groups for each two to about fifteen carbon atoms.

10. The process of bleaching a discolored polyvinyl chloride resin composition containing a colored compound formed by heating the composition at an elevated temperature in the presence of iron compounds contained in naturally-occurring asbestos, which comprises incorporating in the discolored polyvinyl chloride resin composition a small amount of a saturated organic polyhydroxy compound having at least two to about eight alcoholic hydroxyl groups for each two to about fifteen carbon atoms and then heating at an elevated temperature until the color is lessened in intensity.

References Cited in the file of this patent

UNITED STATES PATENTS

| 2,459,746 | Radcliffe | Jan. 18, 1949 |
| 2,490,247 | Amberg | Dec. 6, 1949 |
| 2,734,881 | Lally et al. | Feb. 14, 1956 |
| 2,837,490 | Hecker | June 3, 1958 |
| 2,861,052 | Elliott | Nov. 18, 1958 |

OTHER REFERENCES

Shreve: "Chemical Process Industries," 2nd edition, pages 772-777, McGraw-Hill Book Co., 1956.